UNITED STATES PATENT OFFICE.

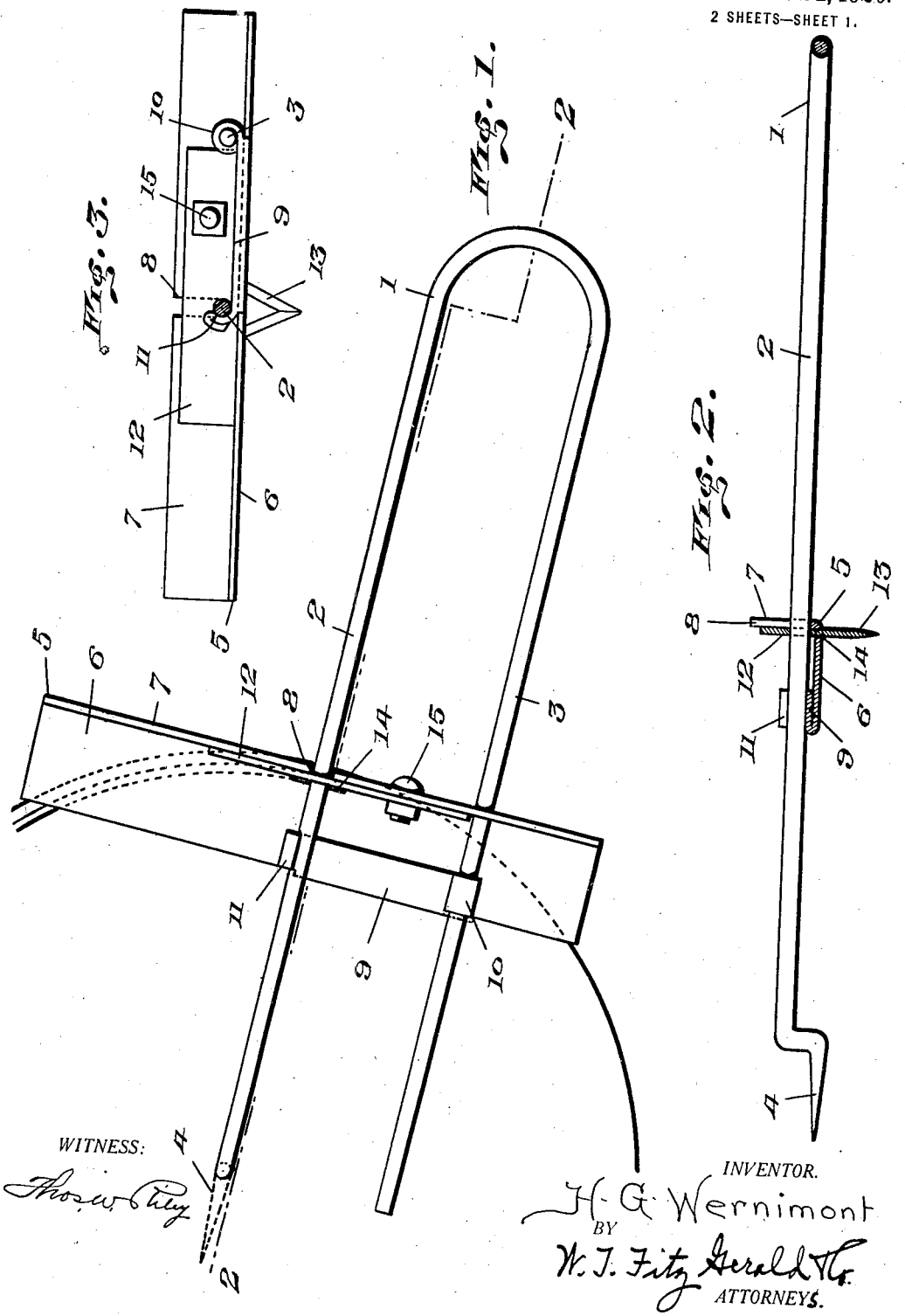

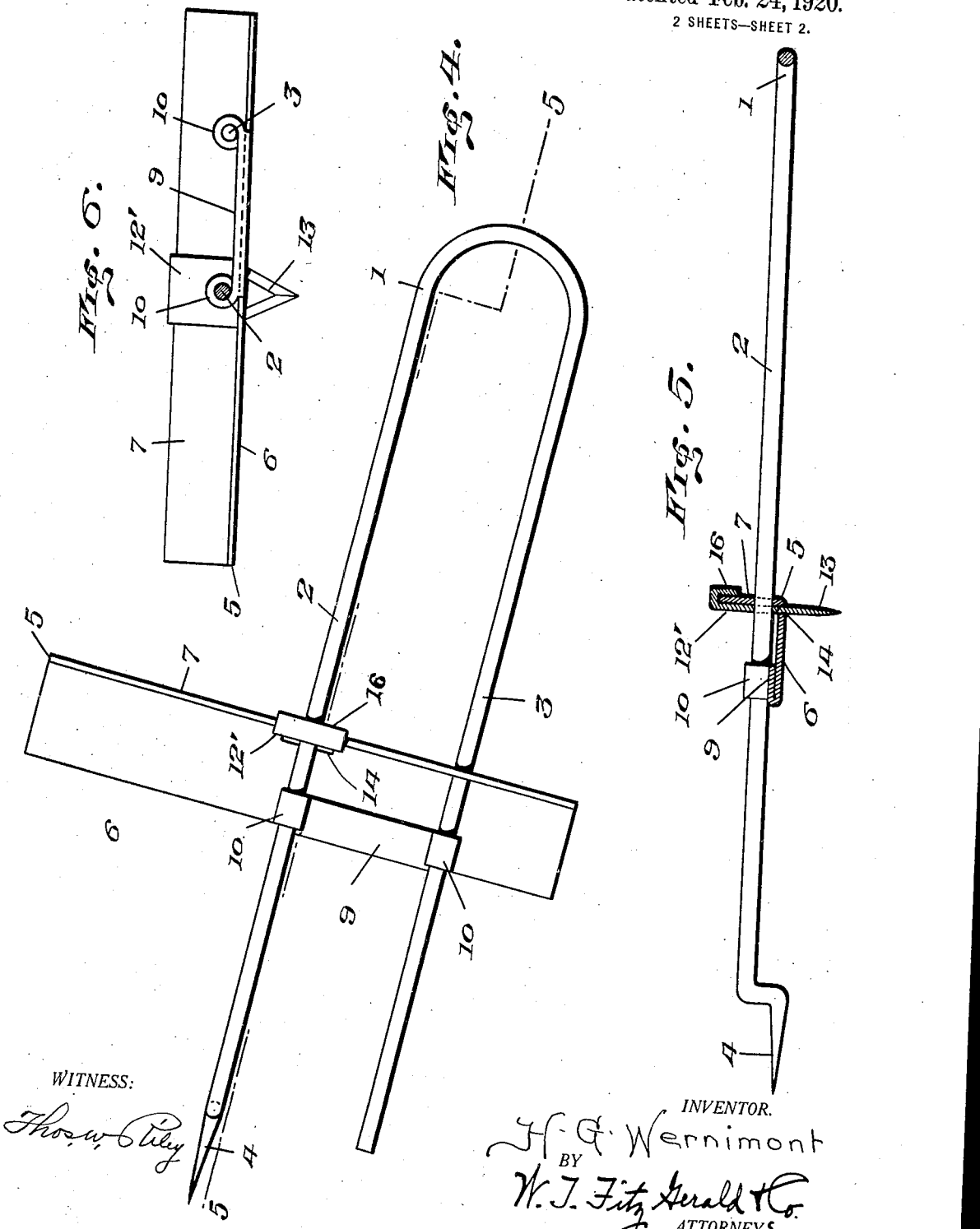

HENRY G. WERNIMONT, OF WASHINGTON, DISTRICT OF COLUMBIA.

CAN-OPENER.

1,331,605.  Specification of Letters Patent.  Patented Feb. 24, 1920.

Application filed January 16, 1919. Serial No. 271,391.

*To all whom it may concern:*

Be it known that I, HENRY G. WERNIMONT, a citizen of the United States, residing at Washington, District of Columbia, have invented certain new and useful Improvements in Can-Openers; and I do hereby declare the following to be a full, clear, and exact description of the invention, such as will enable others skilled in the art to which it appertains to make and use the same.

The present invention relates to can openers, such as have a handle or lever with a prong or other means to pierce or engage the can to connect the handle thereto for swinging or turning movement, so that a cutter carried by the handle will cut an arcuate slit in the end of the can, it being the object of the invention to provide a novel and improved can opener of that character and comprising a novel assemblage of the component elements whereby the utility and efficiency of the implement is enhanced.

One of the objects of the invention is to provide a can opener having a handle and a slide plate of novel construction and assemblage, whereby the tendency of the implement to tilt or twist out of operative position is avoided, and the cutting operation made easier and more effective.

Another object is the provision of a cutter assembled with the handle in a novel manner for adjustment and removal, so that it can be readily replaced when worn out or damaged instead of discarding the entire implement.

It is also an object of the invention to provide such a can opener which can be manufactured at small cost, and which can be used on small and large cans with equal success.

With the foregoing and other objects in view which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing; wherein:—

Figure 1 is a plan view of a preferred form of can opener showing the same as applied to a can.

Fig. 2 is a longitudinal section taken on the line 2—2 of Fig. 1.

Fig. 3 is an inner end view, the prong being broken off.

Fig. 4 is a view similar to Fig. 1 showing a modified form.

Fig. 5 is a longitudinal section taken on the line 5—5 of Fig. 4.

Fig. 6 is a view similar to Fig. 3 of the modified form.

The handle or lever 1 is of U-shape being bent from a suitable length of wire or other stock, having the requisite strength, and the handle has the two inwardly extending parallel arms or portions 2 and 3, the arm 2 being provided at its inner end with a downwardly offset prong 4 to pierce the end of the can at the center thereof in order to pivot or fulcrum the handle to the can for turning movement as well known in this general class of can openers. The arms 2 and 3 of the handle 1 are disposed in a horizontal plane, that is, with the implement used on the top of the can in its usual vertical position.

Carried for longitudinal adjustment by the handle 1 is a slide and pressure plate 5, which, as shown, is of angular or L-shaped cross section, so as to have the horizontal flange 6 and the upstanding or vertical flange 7. This plate 5 extends transversely of the handle and they cross one another; the arm 3 extending pivotally and slidably through an aperture in the flange 7 above the flange 6, and said flange 7 having an upwardly opening vertical slot 8 receiving the arm 2 and permitting it to be moved into and out of said slot or seat. The edge of the flange 6 is provided with a lip or portion 9 bent back thereon between and underneath the arms 2 and 3, and the ends of the lips are bent upwardly, one end being bent around the arm 3 to provide a sleeve 10 embracing said arm and guiding it for sliding movement as well as permitting said arm to turn therein. The other end of the lips 9 is bent upwardly into a notched seat 11 into which the arm 2 snaps when it is swung downwardly into the slot 8, thus assisting in holding the parts in place and making the tool rigid in construction when in use.

The cutter embodies a strip or elongated plate 12 disposed at the inner side of the flange 7 with its lower edge resting on the flange 6, said strip having an aperture through which the arm 2 extends. The lower edge of the strip 12 has a depending tapered or pointed cutter blade 13 extending downwardly through a slot 14 in the flange 6, so as to pierce the end of the can and cut the same, both edges of the blade being sharp so that the implement can be used in either direction for the cutting operation. A bolt 15 or equivalent removable securing element extends through apertures in the flange 7 and strip 12 to clamp and secure them together, in order to hold the strip 12 in place, so that the arm 2 is held down, and the cutter blade 15 maintained rigidly in position. The several parts of the can opener are thus firmly secured together, so as to prevent loose play, as is objectionable in an implement of this character, and when the slide plate 5 is slid to the proper position on the handle, the cutter blade 13 can be readily forced down through the end of the can so that the handle in being swung or turned will cut the end of the can. It is to be noted that the flange 6 of the plate 5 is adapted to slide on the rim of the can, so that the operator can exert downward pressure on the handle as the handle is turned, and the plate 5 in thus pressing down on the rim of the can at opposite sides of the cutter, will overcome the liability of the implement to tilt or twist out of position, as frequently occurs with the use of the ordinary devices of this character. Thus, by pressing the handle down during the operation, the can will be slit with a firm cut, thus making the operation easy and avoiding troublesome displacement of the tool while in use.

The blade can be readily removed, so as to be replaced when worn out, in order to avoid the expense of discarding the entire implement, it being possible to furnish the blades at extremely small cost. To remove the blade, the bolt or securing means 15 is removed, thus permitting the strip 12 to move upwardly with the arm 2. Thus, when the plate 5 is held, the handle 1 can be swung transversely around the axis of the arm 3, the arm 2 disengaging from the seat 11 and moving out of the slot 8. The strip 12 of the cutter can then be slid off of the arm 2, and a new one put back on, and then moved into place and secured.

The modification shown in Figs. 4, 5 and 6 is of somewhat similar construction, but the cutter is not made removable, the construction being simplified. Thus, the bent back lip 9 has both ends embracing the arms 2 and 3, as at 10, to hold said arms for sliding movement above the flange 6. The cutter comprises a vertical strip 12' extending across the inner side of the flange 7 and provided at its lower end with the blade 13 extending downwardly through the slot 14 in the flange 6, and the upper end of the strip 12' is bent back outwardly over the upper edge of the flange 7. This, together with the passage of the arm 2 through apertures in the flange 7 and strip 12' secures the cutter firmly in place. The adjustment and use of this modified form of can opener are the same as with the preferred form, the cutter can not be so easily removed and replaced, although this form of implement can be manufactured at smaller cost.

Having thus described the invention, what is claimed as new is:—

1. A can opener comprising a slide plate to slide on the rim of a can having an upstanding flange and a slot, a cutter overlapping said flange and having a blade extending through said slot, a handle extending through said flange and blade across said plate and serving to hold the blade against said flange, said handle having can-engaging means at one end.

2. A can opener comprising a slide plate to slide on the rim of a can, a handle extending at an angle over said plate, said plate having means extending upwardly and engaging the handle to removably and slidably hold the handle to the plate, and a cutter above the plate having a blade extending downwardly therefrom at an angle, said cutter being removable and engaging the handle to be held against the plate by the handle.

3. A can opener comprising a slide plate to bear on the rim of a can, a handle having parallel arms, one arm having can engaging means at one end, said plate having means engaging said arms enabling one arm to turn relatively to the plate and the other arm to be moved toward and away from said plate and to be held adjacent to the plate, a cutter above the plate having a blade extending downwardly at an angle therefrom, said cutter engaging the last named arm of the handle to move therewith, and means for securing the cutter to the plate.

4. A can opener comprising a slide plate to bear on the rim of a can, a U-shaped handle having arms extending across said plate, one arm having a can engaging prong at its inner end, said plate having portions extending upwardly to engage said arm slidably, and permit one arm to be removed from the plate, and a removable cutter blade depending from said plate and engaging said arm.

5. A can opener comprising a slide plate to bear on the rim of a can having an upstanding flange and a slot, a cutter bearing against said flange and having a blade extending downwardly through said slot, and a U-shaped handle having arms extending through said flange, one arm having can engaging means at its inner end, said plate having portions extending upwardly to engage said arms, and one arm extending through said cutter to assist in holding it in place.

6. A can opener comprising a slide plate to bear on the rim of a can, a handle having parallel arms extending across said plate, the plate having means embracing one arm for sliding and turning movement, and having means for removably receiving the other arm for sliding movement, and a cutter detachably secured on said plate and having a blade extending downwardly therefrom, the second named arm of the handle extending through said cutter.

7. A can opener comprising a slide plate to bear on the rim of a can, and having an upstanding flange, and a slot, a U-shaped handle having parallel arms extending through said flange over said plate, the flange having an aperture for one arm and an upwardly opening slot for the other, a cutter bearing against said flange and having a blade extending downwardly through the first named slot, said cutter having an aperture through which the second named arm extends, and means for detachably securing said cutter to said flange.

In testimony whereof I have signed my name to this specification.

HENRY G. WERNIMONT.